(12) United States Patent
Cairns et al.

(10) Patent No.: US 8,411,725 B2
(45) Date of Patent: Apr. 2, 2013

(54) CHANNEL GEOMETRY DETECTOR

(75) Inventors: Douglas A. Cairns, Durham, NC (US);
Jaroslaw Niewczas, Jozefow (PL);
Yoshitaka Murata, Yokohama (JP);
Elias Jonsson, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 749 days.

(21) Appl. No.: 12/566,749

(22) Filed: Sep. 25, 2009

(65) Prior Publication Data

US 2011/0075706 A1 Mar. 31, 2011

(51) Int. Cl.
*H04B 1/00* (2006.01)
*H03H 7/30* (2006.01)

(52) U.S. Cl. ......... 375/130; 375/147; 375/150; 375/229

(58) Field of Classification Search .................. 375/130, 375/140, 135, 136, 134, 146, 147, 142, 144, 375/148, 150, 152, 295, 316, 340, 346, 348, 375/350
See application file for complete search history.

(56) References Cited

U.S. PATENT DOCUMENTS

| | | | |
|---|---|---|---|
| 7,082,174 B1 * | 7/2006 | Smee et al. | 375/349 |
| 2006/0268962 A1 * | 11/2006 | Cairns et al. | 375/148 |
| 2007/0076643 A1 * | 4/2007 | Yang et al. | 370/310 |
| 2008/0117833 A1 * | 5/2008 | Borran et al. | 370/252 |
| 2009/0010313 A1 * | 1/2009 | Hasegawa | 375/148 |
| 2009/0111413 A1 * | 4/2009 | Luschi et al. | 455/230 |

* cited by examiner

*Primary Examiner* — Sam K Ahn
*Assistant Examiner* — Linda Wong

(57) ABSTRACT

Adaptive reconfiguration of a wireless receiver is enabled based on channel geometry. According to an embodiment, the wireless receiver includes a geometry factor processing module and signal processing modules, e.g. such as but not limited to an SIR estimation module, a power estimation module, a despreading module, a low-pass filter, a combing weight generation module, a coefficient estimation module, a synchronization control channel interference canceller module, etc. The geometry factor processing module determines a geometry factor for the channel over which signals are transmitted to the wireless receiver, the geometry factor being a measure of the ratio of total transmitted power received by the wireless receiver to total interference plus noise power at the wireless receiver. One or more of the receiver signal processing modules are reconfigurable based on the geometry factor.

30 Claims, 3 Drawing Sheets

CHANNEL GEOMETRY DETECTOR

TECHNICAL FIELD

The present invention generally relates to reconfigurable wireless receivers, and more particularly relates to reconfiguring a wireless receiver based on an estimate of channel geometry.

BACKGROUND

In WCDMA (Wideband CDMA) systems, the wireless receiver must demodulate and decode data effectively across a wide range of operating conditions. Some operating conditions that affect receiver performance include channel dispersion, receiver speed and channel geometry (the ratio of transmitter power to cumulative interference plus noise power). Ideally, a wireless receiver should obtain the best possible performance given the operating conditions. One approach to maximize performance is a fixed receiver configuration. Alternatively, the receiver can detect operating conditions and re-configure itself (adaptive configuration).

To obtain the best possible performance given the operating conditions, a fixed configuration receiver must be designed to handle worst-case operating conditions. For example, the wireless receiver must be equipped to handle extremely high speeds and a highly dispersive channel as well as no motion and a flat channel. Such a receiver would be extremely expensive in terms of power, computational complexity, and chip area, and is thus not practical. In contrast, a limited fixed receiver configuration focuses on a particular range of operating conditions to reduce receiver cost and complexity. While this approach generally works well for the expected range of operating conditions, overall receiver performance degrades when actual operating conditions differ from the expected operating conditions. The degradation can be significant and seriously impact the ability of the receiver to offer, for example, both peak data rates and robust performance at low SIR.

Other types of conventional receivers have a reconfigurable equalizer. In some cases, the equalizer is reconfigured as a function of receiver speed. For example, a nonparametric equalizer is employed at low speeds whereas a parametric equalizer is employed otherwise. In other cases, the equalizer is reconfigured as a function of channel dispersion. For example, the equalizer may employ a grid of equalizer fingers (symbol-level) or equalizer taps (chip-level) spaced at equidistant intervals. The grid spacing and extent (i.e. number of fingers/taps) is then varied as a function of channel dispersion. In each of these cases, only the equalizer is reconfigured as a function of either receiver speed or channel dispersion, limiting receiver adaptability.

SUMMARY

Adaptive reconfiguration of a wireless receiver is enabled based on channel geometry. According to an embodiment, the wireless receiver includes a geometry factor processing module and signal processing modules, e.g. such as but not limited to an SIR (signal-to-interference ratio) estimation module, a power estimation module, a despreading module, a low-pass filter, a combing weight generation module, a coefficient estimation module, a synchronization control channel interference canceller module, etc. The geometry factor processing module determines a geometry factor for the channel over which signals are transmitted to the wireless receiver, the geometry factor being a measure of the ratio of total transmitted power received by the wireless receiver to the total interference plus noise power at the wireless receiver. One or more of the receiver signal processing modules are reconfigurable based on the geometry factor. For example, the functions or algorithms implemented by one or more of the signal processing modules can be reconfigured responsive to the geometry factor. In addition or alternatively, the parameters input to the signal processing modules can also be reconfigured responsive to the geometry factor. In each case, a wireless receiver that is highly adaptive to interference conditions is provided.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
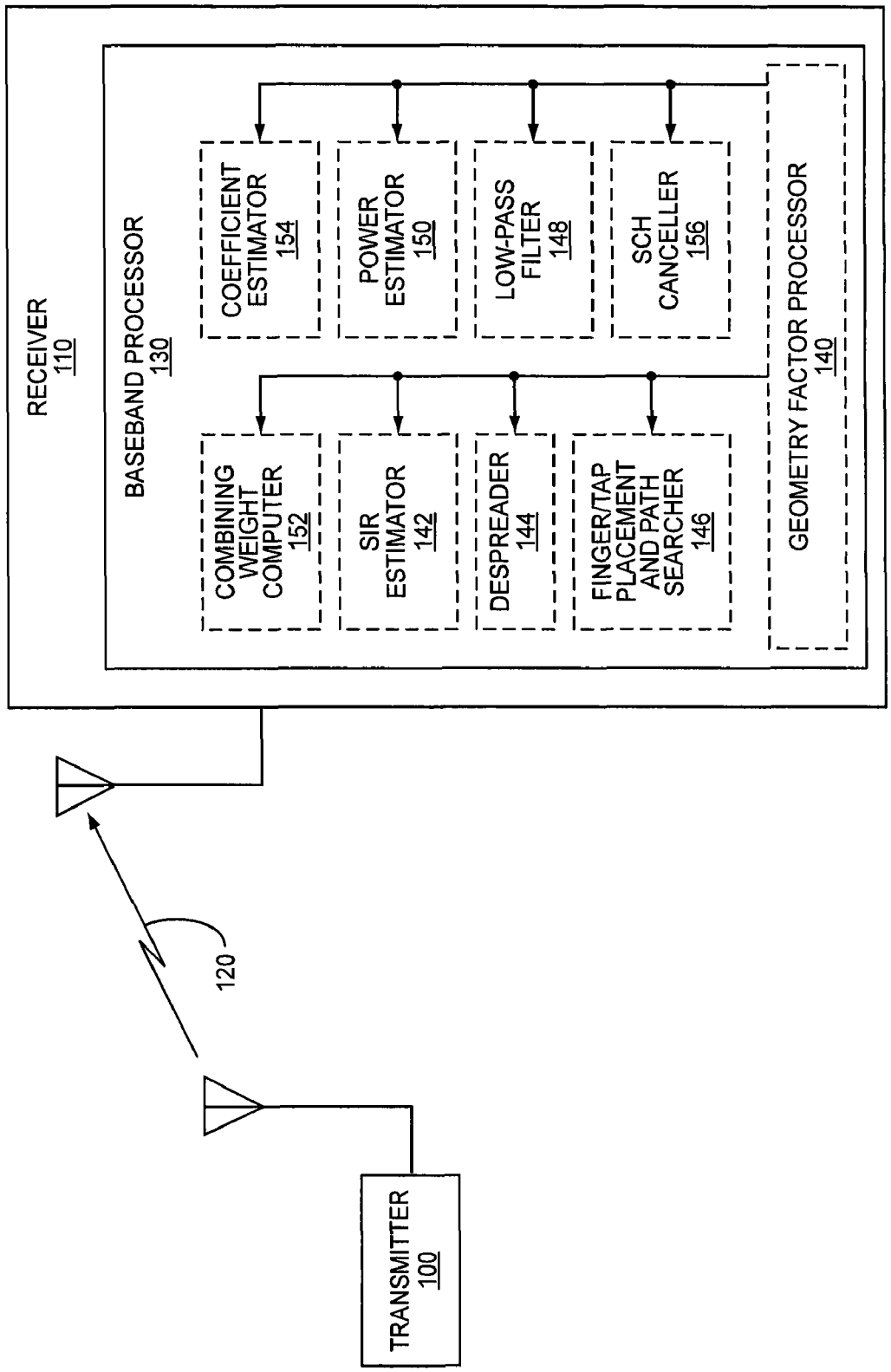
FIG. 1 illustrates a block diagram of an embodiment of a receiver including a geometry factor processing module.

FIG. 1 illustrates an embodiment of a wireless transmitter 100 in communication with a wireless receiver 110 over a channel 120. The receiver 110 includes a baseband processor 130. Various signal processing modules are included in or associated with the baseband processor 130. The signal processing modules implement various functions or algorithms based on parameters input to the modules, enabling the receiver 110 to function properly. One or more of the signal processing modules can be reconfigured based on a geometry factor determined for the channel 120 over which signals are transmitted to the receiver 110. The signals can be transmitted to the receiver 110 in the uplink direction (i.e. mobile station to base station) or the downlink direction (i.e. base station to mobile station). In either case, the geometry factor is a measure of the ratio of total transmitted power received by the wireless receiver 110 to the total interference plus noise power at the wireless receiver 110. The receiver 110 includes a geometry factor processing module 140 included in or associated with the baseband processor 130 for determining the geometry factor as given by:

$$\rho = \frac{\hat{I}_{or}}{I_{oc}} \quad (1)$$

where $I_{oc}$ is the total interference plus noise power at the wireless receiver 110 and $\hat{I}_{or}$ is the total transmitter power received by the receiver 110. The channel geometry factor is a location dependent value for each user in the same cell. For locations close to the transmitter 100, the interference is likely to be relatively low (i.e., high geometry), while for locations close to the cell edge, the interference is likely to be relatively high (i.e., low geometry). Reconfiguring one or more of the signal processing modules as a function of the geometry factor enables the receiver 110 to readily adapt to changing interference conditions, improving receiver performance and reliability, e.g. by increasing throughput and/or reducing error rate.

Various embodiments for determining the geometry factor are described next with reference to symbol-level equalization and chip-level equalization. Those skilled in the art will recognize that the techniques described herein in the context of symbol-level equalization can be readily adapted to chip-level equalization and vice-versa. According to one embodiment, the geometry factor processing module 140 uses a pilot-based SIR estimate to compute the geometry factor. The wireless receiver 110 includes an SIR estimation module 142 for generating the pilot-based SIR estimate based on channel estimates derived from a pilot channel such as CPICH (Common Pilot Channel) which used in UMTS (Universal Mobile Telecommunications System) and other CDMA communications systems. The SIR value computed by the SIR estimation module 142 is proportional to the transmission power of the pilot channel. Accordingly, if the transmit power of the pilot channel is configured high, the SIR estimate will also be high in the same geometry. However, since the pilot transmission power from the transmitter 100 (e.g. a base station) is unknown at the wireless receiver 110, the pilot transmission power cannot be directly used to compute the geometry factor. Instead, the pilot transmission power is estimated and this estimate then used to calculate the geometry factor.

For purely illustrative purposes only, several power estimation embodiments are described next with reference to the CPICH pilot channel. CPICH power relative to the total transmit power is fixed and may be configured by the transmitter 100 to be for example −12 dBm, but may vary between −7 dBm and −15 dBm. For WCDMA applications, the wireless receiver 110 controls the amplitude of the received signal via AGC (Automatic Gain Control) which applies a variable gain. The received power level after AGC is fixed. The fixed received signal level allows for optimal signal quantization. The AGC-controlled signal is then sent to various receiver despreaders including CPICH de-spreaders which are part of a despreader module 144.

Figure 2:
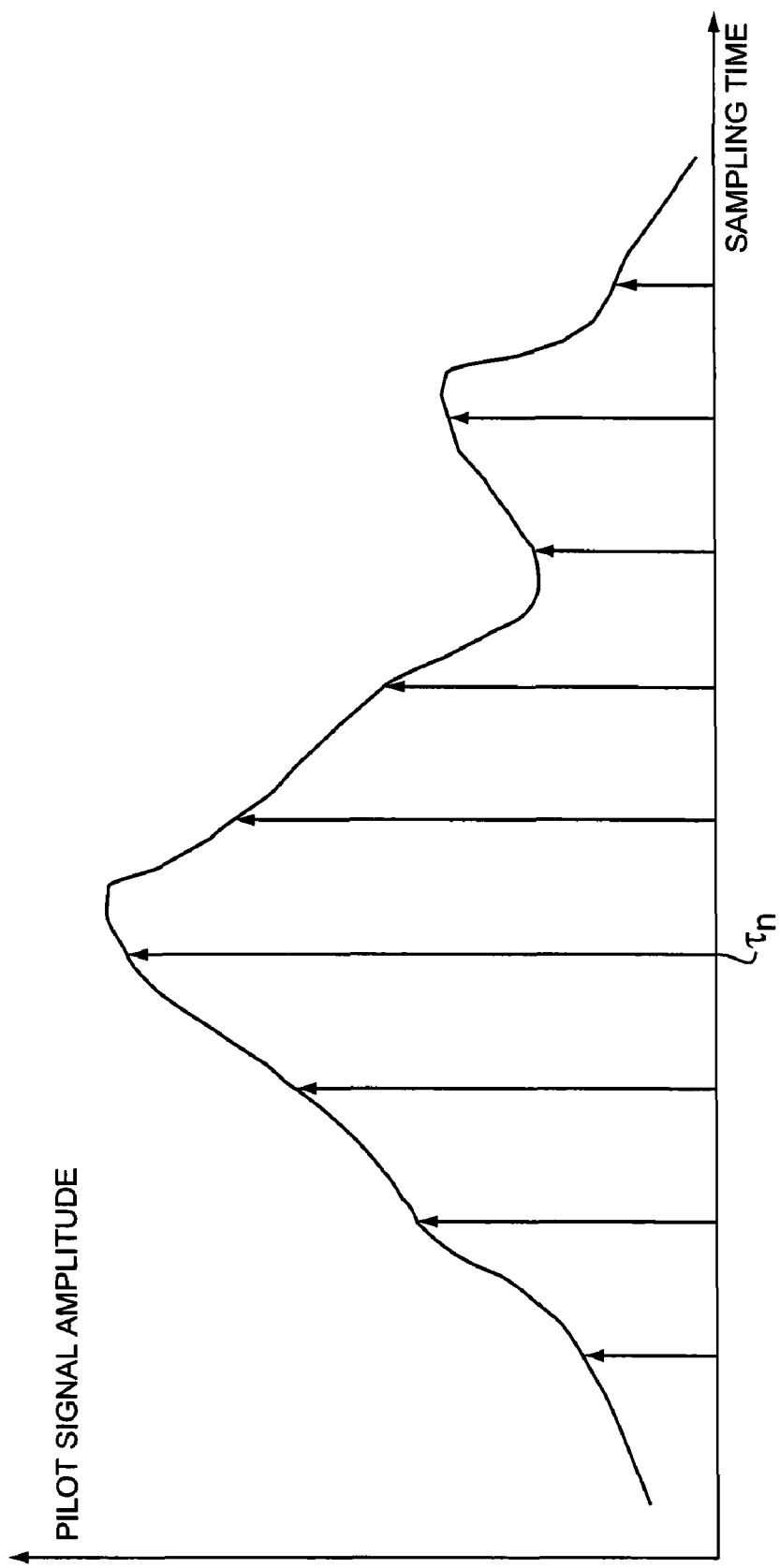
FIG. 2 illustrates a signal diagram of a pilot signal sampled at different path delays.

The total power at the output of all CPICH despreaders remains constant irrespectively of fading due to AGC compensation and irrespectively of sub-path energies in any multipath profile, as long as the equalizer fingers (symbol-level equalization) or equalizer taps (chip-level equalization) selected by a finger/tap placement and path searcher module 146 capture energy from those paths (i.e. all paths are covered by the fingers/taps). The equalizer fingers/taps are each set to a particular path delay selected by the finger/tap placement and path searcher module 146. FIG. 2 illustrates an exemplary received CPICH signal sampled at certain fixed intervals, each interval corresponding to a particular path delay τ. The area under the signal curve represents the total CPICH signal power. To compute power accurately, the sampled CPICH signal is filtered by a low-pass filter module 148. The whole power of the sampled CPICH signal is then integrated by a power estimation module 150 after low-pass filtering.

If all signal paths are covered by the fingers/taps, the whole energy of the sampled CPICH signal is integrated. The resulting total CPICH energy determines the CPICH power level respective to the total transmitted power. In most practical cases, the majority of CPICH energy is covered by the sampling grid of fingers/taps. The small part of the energy not covered by the fingers/taps may result in minor underestimation of the CPICH power. The power of additional paths which are not covered by the finger/tap grid and thus not available for power integration, may have their power estimated (with respect to the main paths), e.g. based on a path searcher report. The power estimation module 150 can include the power estimate for each of these additional path delays in the total estimate of CPICH power. A highly accurate CPICH power estimate (and hence geometry) is not required, and accuracy within +/−1 to 2 dB is usually sufficient.

Figure 3:
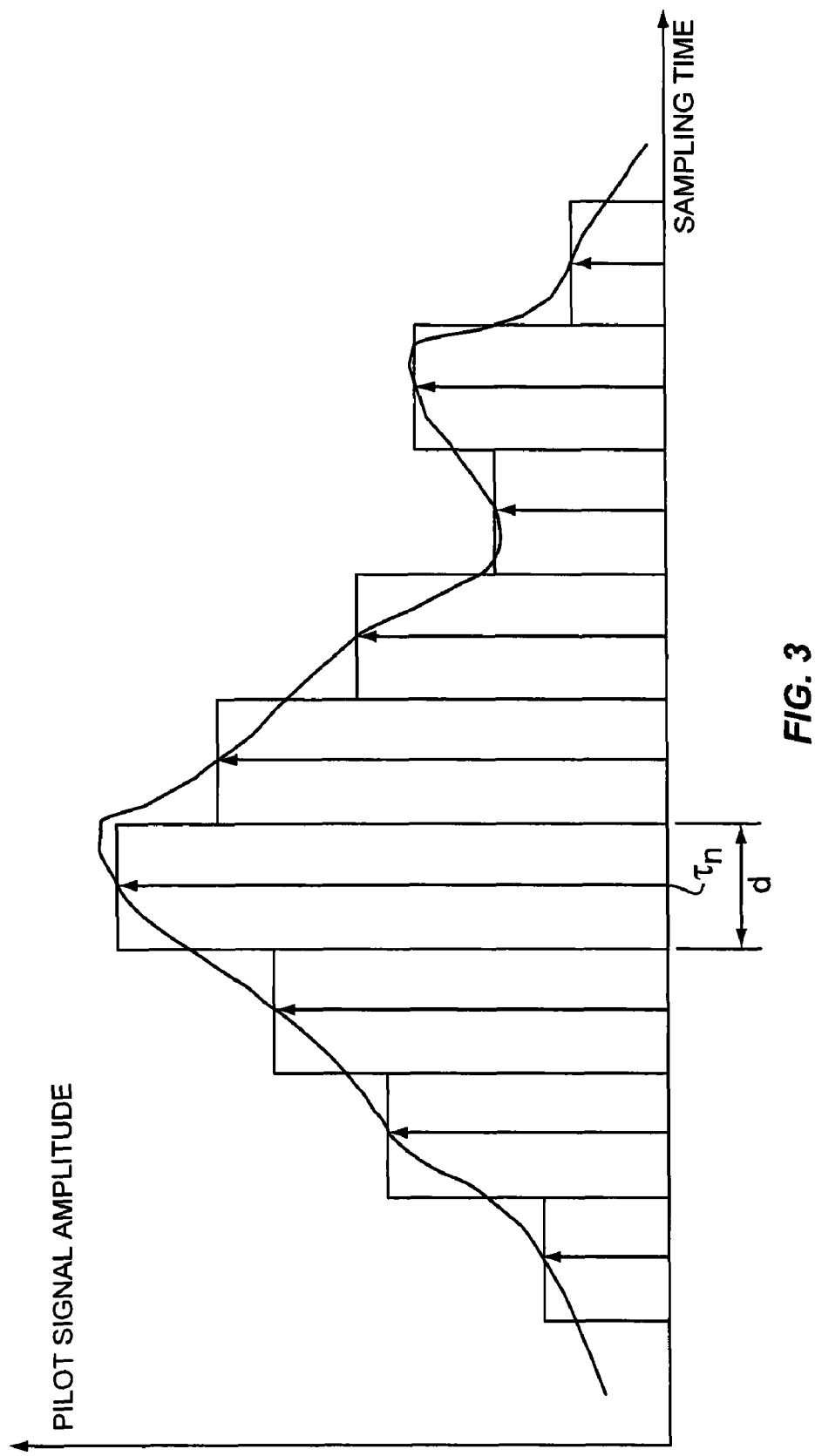
FIG. 3 illustrates a signal diagram of a pilot signal sampled at different path delays for which power is estimated based on a fixed spacing interval.

In another embodiment, the transmit power of the pilot channel is not estimated via filtering and integration. Instead, the area under the sampled pilot signal curve is approximated by the power estimation module 150 with rectangles as shown in FIG. 3. Each rectangular area represents the CPICH amplitude for finger/tap delay $\tau_n$, multiplied by a spacing distance d. The CPICH amplitude can be converted into an instantaneous power estimate as given by:

$$\text{CPICH\_power}_{current} = \sum_{sum\_over\_peaks} \text{power\_estimates}_{CPICH}(\tau) \quad (2)$$

Given the pilot power estimate, the geometry factor may be calculated as given by:

$$\rho = \frac{\text{CPICH\_power}_{filtered}}{SIR_{filtered}} \cdot d + \text{offset} \quad (3)$$

where $$SIR_{filtered}(n) = \lambda_A SIR_{filtered}(n-1) + (1 - \lambda_A) SIR_{current} \quad (4)$$

and $$\text{CPICH\_power}_{filtered}(n) = \quad (5)$$
$$\lambda_B \text{CPICH\_power}_{filtered}(n-1) + (1 - \lambda_B) \text{CPICH\_power}_{current}$$

Equations (4) and (5) smooth or filter the slot-based SIR and CPICH estimates over several slots using scaling constants $\lambda_A$ and $\lambda_B$, respectively. $SIR_{GRAKE\_current}$ and $CPICH\_power_{GRAKE\_current}$ are the current slot-based SIR and CPICH power estimates, respectively corresponding to slot n. The power estimation module 150 can obtain the slot-based CPICH power estimate $CPICH\_power_{GRAKE\_current}$ from equation (2). The SIR estimation module 142 can obtain the slot-based SIR estimate for the pilot channel as given by:

$$SIR_{current} = \frac{|\hat{w}^H \hat{h}|^2}{\hat{w}^H \hat{R}_u \hat{w}} \quad (6)$$

or equivalently, by:

$$SIR_{current} = \hat{w}^H \hat{h} \quad (7)$$

In equations (6) and (7), $\hat{w}$ represents G-Rake combining weights computed by a combining weight computation module 152. The combining weights can be applied at the symbol or chip level. Either way, $\hat{h}$ represents the estimated net channel coefficients determined by a coefficient estimator module 154 and $\hat{R}_u$ is an estimate of the impairment covariance matrix also generated by the coefficient estimation module 154. The offset value in equation (3) can be derived through simulation and depends on numerical implementation aspects, such as finger/tap spacing, and may also include compensation for path delays not covered by the finger/tap grid. According to the second pilot transmit power estimation embodiment described above, the pilot signal is despread by the despreading module 144 at path delays selected by the finger/tap placement and path searcher module 146 to generate despread pilot signal values. The power estimation module 150 multiples each despread pilot signal value by a delay spacing distance d as shown in FIG. 3. The results are summed to generate an instantaneous estimate of the transmit power level of the pilot channel at the wireless receiver 100 as given by equation (2). According to either pilot transmit power estimation embodiment, the geometry factor processing module 140 calculates the channel geometry factor based on the pilot channel power estimate as given by equation (3) with optional smoothing as given by equations (4) and (5).

According to another embodiment, the geometry factor processing module 140 uses combining weight correlation information to compute the geometry factor. For example, equalization reduces to maximum ratio combining when the environment is noise-limited. As such, the correlation between the weights used for maximum ratio combining (i.e. Rake) and the weights used for equalization (i.e. G-Rake) can be considered. A correlation coefficient for maximum ratio combining and equalization combining weights is given by:

$$\sigma_{weights} = \frac{\hat{w}^H \hat{h}}{\sqrt{(\hat{w}^H \hat{w})(\hat{h}^H \hat{h})}} \quad (8)$$

which can also be written as:

$$\sigma_{weights} = \frac{SIR_{GRAKE\_current}}{\sqrt{(\hat{w}^H \hat{w})(\hat{h}^H \hat{h})}} \quad (9)$$

The instantaneous correlation coefficient given by equation (8) is likely to be noisy. Accordingly, smoothing/filtering can be applied to increase reliability as given by:

$$\tilde{\sigma}(n) = \beta \tilde{\sigma}(n-1) + (1-\beta)\sigma_{weights} \quad (10)$$

where $0 \leq \beta \leq 1$. Since high correlation between the combining weights and the net channel coefficients indicates low channel geometry, the geometry factor processing module 140 can assign the geometry factor as given by:

if $\tilde{\sigma}(n) > \sigma_{thresh}$, then low geometry and $\rho = \rho_{low}$, else $\rho = \rho_{high}$ (11)

The threshold value $\sigma_{thresh}$ is a correlation threshold that can be determined through simulation and/or measurement. Also, $\rho_{low}$ and $\rho_{high}$ are preferably coordinated with the geometry factor threshold $\rho_{thresh}$ described in more detail later herein.

According to yet another embodiment, the geometry factor is calculated based on SIR information. In a noise-limited environment, the SIR estimated via maximum ratio combining is very similar to the SIR estimated via G-Rake equalization. Therefore, the ratio of the two SIR values provides information about the geometry factor. In one embodiment, the geometry factor processing module 140 determines the geometry factor as given by:

$$\rho = \frac{SIR_{RAKE\_filtered}}{SIR_{GRAKE\_filtered}} \quad (12)$$

where by: $SIR_{GRAKE\_filtered}$ is given by equation (4) and $SIR_{RAKE\_filtered}$ is given by:

$$SIR_{RAKE\_filtered}(n) = \lambda_C SIR_{RAKE\_filtered}(n-1) + (1-\lambda_C) SIR_{RAKE\_current} \quad (13)$$

The SIR values can be generated by combining soft symbol values. Again, smoothing or filtering can be applied to the Rake SIR estimate $SIR_{RAKE\_filtered}$ over several slots as indicated by the scaling constant $\lambda_C$. The current Rake SIR value $SIR_{RAKE\_current}$ in equation (13) can be obtained from:

$$SIR_{GRAKE\_current} = \frac{|\hat{h}^H \hat{h}|^2}{\hat{h}^H \hat{R}_u \hat{h}} \quad (14)$$

where $\hat{h}$ represents the estimated net channel coefficients and $\hat{R}_u$ is an estimate of the impairment covariance as explained previously herein.

The geometry factor is then used to reconfigure one or more of the signal processing modules of the wireless receiver 110. The terms "configure" and "reconfigure" as used herein refer to the control, function and/or interconnection of the various sub-algorithms implemented by the signal processing modules that make up the overall wireless receiver 110 as well as the sub-algorithm parameter settings. The signal processing modules can be implemented in dedicated or shared hardware, software, firmware, or some combination thereof. With this understanding, one or more of the signal processing modules can be reconfigured based on the channel geometry.

According to one embodiment, the number of equalizer fingers (symbol-level equalization) or equalizer taps (chip-level equalization) used by the wireless receiver 110 for interference cancellation is determined by the geometry factor processing module 140. In low geometry scenarios, it is beneficial to reduce the number of fingers/taps and use only the strongest ones. More fingers/taps are beneficial for other geometry scenarios. In one embodiment, the number of fingers/taps is determined as given by:

if $\rho < \rho_{threshold\_low}$, then N1 fingers/taps are selected for interference cancellation, else if $\rho < \rho_{threshold\_high}$, then N2 fingers/taps are used for interference cancellation (N2≧N1), else N3 fingers/taps are used for interference cancellation (N3>N2≧N1) (15)

where $\rho$ is the computed geometry factor, $\rho_{threshold\_low}$ is a lower threshold value and $\rho_{threshold\_high}$ is an upper threshold value. In a purely exemplary embodiment, $\rho_{threshold\_low}$ can be 0 dB and $\rho_{threshold\_high}$ can be 15 dB. In some embodiments, equalization is disabled when the geometry factor falls below the lower threshold value. Under this scenario, the wireless receiver 110 is configured for maximum ratio combining.

According to another embodiment, the nonparametric impairment covariance matrix estimate $\hat{R}_u$ generated by the coefficient estimation module 154 is filtered as a function of the geometry factor. Lower channel geometries cause such matrices to be noisy, so increased filtering enables improved equalization performance. Less filtering is beneficial for medium and high geometry factors so that higher receiver speeds can be supported. In one embodiment, filtering constants applied to the nonparametric impairment covariance matrix estimate $\hat{R}_u$ are determined by the geometry factor processing module 140 as a function of the geometry factor $\rho$ as given by:

if $\rho < \rho_{threshold\_low}$, then $\tilde{R}_u(n) = \alpha_{low}\tilde{R}_u(n-1) + (1-\alpha_{low})\hat{R}_u$, else if $\rho < \rho_{threshold\_high}$, then $\tilde{R}_u(n) = \alpha_{medium}\tilde{R}_u(n-1) + (1-\alpha_{medium})\hat{R}_u$, else $\tilde{R}_u(n) = \alpha_{high}\tilde{R}_u(n-1) + (1-\alpha_{high})\hat{R}_u$  (16)

where $\tilde{R}_u(n)$ is the filtered covariance matrix estimate corresponding to slot n, $\hat{R}_u$ is the current slot-based estimate of the covariance matrix, and $0 \leq \alpha_{high} \leq \alpha_{medium} \leq \alpha_{low} \leq 1$. The filtering applied is a type of IIR (Infinite Impulse Response) filtering, where the different $\alpha$ values determine the filter bandwidth. In a purely exemplary embodiment, $\alpha_{high} \approx 0.90$ and $\alpha_{low} \approx 0.99$.

The filtering of parameter estimates for other receiver algorithms can also be varied as a function of the geometry factor. In some embodiments, algorithms based on pilot information also benefit from increased filtering, whether applied directly to pilots or indirectly to the final output of the algorithms. For example AFC (Automatic Frequency Control), AGC and SIR estimation algorithms are each based on pilot sequences, and either the input pilot sequence or the algorithm output can be more intensively filtered (i.e. longer memory in filtering algorithm) in low geometry scenarios. As with covariance estimation, less filtering may be beneficial for medium and high geometry scenarios. In a purely representative embodiment, an SIR estimate generated by the SIR estimation module 142 is filtered by the geometry factor processing module 140 based on the geometry factor $\rho$ as given by:

if $\rho < \rho_{threshold\_low}$, then $SIR_{filt}(n) = \lambda_{low}SIR_{filt}(n-1) + (1-\lambda_{low})SIR_{inst}$, else if $\rho < \rho_{threshold\_high}$, then $SIR_{filt}(n) = \lambda_{medium}SIR_{filt}(n-1) + (1-\lambda_{medium})SIR_{inst}$, else $SIR_{filt}(n) = \lambda_{high}SIR_{filt}(n-1) + (1-\lambda_{high})SIR_{inst}$  (17)

where $SIR_{filt}(n)$ is the filtered SIR estimate corresponding to slot n, $SIR_{inst}$ is the current slot-based SIR estimate, e.g. as given by equation (6) or (7), and $0 \leq (\lambda_{low}, \lambda_{medium}, \lambda_{high}) \leq 1$. The exact filtering parameters depend on geometry estimation, receiver implementation details, and other factors such as channel dispersiveness. Optimal parameters can be estimated from either simulation or determined by measurement.

In yet another embodiment, the number of parameters estimated for use by the wireless receiver 110 when configured as a parametric G-Rake receiver is determined by the geometry factor processing module 140. For example, a scaling factor for white noise is very difficult to estimate reliably for high geometry factors because the scaling factor is very small under these conditions. Improved performance can be obtained if the white noise scaling factor is set to a small fixed value and only the impairment scaling factor is estimated. In one embodiment, only the impairment scaling factor is estimated for high geometry scenarios. For low and medium geometry scenarios, both the white noise and the impairment scaling factors are estimated.

In still another embodiment, the amount of soft scaling applied to symbols received by the wireless receiver 110 which are subject to interference caused by a downlink synchronization control channel is determined as a function of the geometry factor. For example, symbols transmitted during the same time as the SCH synchronization chip sequence are subject to additional interference from the SCH. For power-controlled transmission scenarios, SCH interference becomes problematic in high geometry scenarios, when transmit power is dropped. As such, un-cancelled SCH interference becomes more dominant and the receiver 110 benefits by reducing the amplitude of soft-bits affected by the SCH sequence. In one embodiment, the geometry factor processing module 140 provides one soft bit scaling for SCH-affected symbols for high geometry factors and another soft bit scaling for low and medium geometry factors. The geometry factor processing module 140 can also enable or disable the SCH interference cancelling module 156 as a function of the geometry factor. The SCH cancelling module 156 typically provides the most benefit for medium to high geometry scenarios, because for lower geometry, channel noise dominates SCH interference. Therefore, enabling the SCH cancelling module 156 for medium and high channel geometry scenarios and disabling the SCH cancelling module 156 for low geometries improves receiver performance. In addition, the geometry factor processing module 140 can also select appropriate SCH canceller parameters for medium or high geometry factors.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of re-configuring a wireless receiver, comprising:
computing a first signal-to-interference ratio (SIR) value when the wireless receiver is configured as a maximum ratio combining receiver and a second SIR value when the wireless receiver is configured as an equalizing receiver;
determining a geometry factor for a channel over which signals are transmitted to the wireless receiver, the geometry factor being a measure of a ratio of total transmitted power received by the wireless receiver to total interference plus noise power at the wireless receiver, and the geometry factor is based on a ratio of the first and second SIR values; and
reconfiguring one or more signal processing modules of the wireless receiver based on the geometry factor.

2. The method of claim 1, comprising:
estimating a signal-to-interference ratio (SIR) at the wireless receiver; and
determining the geometry factor based on the SIR estimate.

3. The method of claim 2, comprising:
estimating the SIR based on channel estimates derived by the wireless receiver from a pilot signal transmitted over a pilot channel, the pilot channel having a transmit power level which is unknown to the wireless receiver;

estimating the transmit power level of the pilot channel at the wireless receiver; and determining the geometry factor based on a ratio of the transmit power level estimate to the SIR estimate.

4. The method of claim 3, comprising:
despreading the pilot signal at path delays selected by the wireless receiver;
low-pass filtering the pilot signal after despreading; and
integrating the pilot signal after low-pass filtering to estimate the transmit power level of the pilot channel at the wireless receiver.

5. The method of claim 4, further comprising including in the estimate of the transmit power level of the pilot channel a power estimate for one or more additional path delays not used by the wireless receiver to despread the pilot channel.

6. The method of claim 3, comprising:
despreading the pilot signal at path delays selected by the wireless receiver to generate despread pilot signal values;
multiplying each despread pilot signal value by a delay spacing distance implemented by the wireless receiver; and
summing results of the multiplication to generate an instantaneous estimate of the transmit power level of the pilot channel at the wireless receiver.

7. The method of claim 6, further comprising smoothing the instantaneous estimate of the transmit power level of the pilot channel over a plurality of slots.

8. The method of claim 1, comprising:
computing combining weights and net channel coefficients by the wireless receiver;
determining a degree of correlation between the combing weights and the net channel coefficients; and
determining the geometry factor based on the degree of correlation between the combing weights and the net channel coefficients.

9. The method of claim 8, comprising:
setting the geometry factor to a first value indicating a relatively high degree of interference responsive to the degree of correlation being above a particular threshold value set by the wireless receiver; and
otherwise setting the geometry factor to a second value indicating a relatively low degree of interference.

10. The method of claim 1, comprising determining a number of equalizer fingers or equalizer taps used by the wireless receiver for cancelling interference as a function of the geometry factor.

11. The method of claim 10, further comprising disabling equalization at the wireless receiver and configuring the wireless receiver for maximum ratio combining responsive to the geometry factor being below a particular threshold.

12. The method of claim 1, comprising determining an amount of filtering applied to one or more estimates generated by the one or more signal processing modules of the wireless receiver as a function of the geometry factor.

13. The method of claim 1, comprising determining a number of parameters estimated by the wireless receiver during parametric equalization as a function of the geometry factor.

14. The method of claim 1, comprising determining, as a function of the geometry factor, an amount of soft scaling applied to symbols received by the wireless receiver which are subject to interference caused by a downlink synchronization channel.

15. The method of claim 14, comprising determining whether to enable or disable an interference canceller module of the wireless receiver as a function of the geometry factor, the interference canceller module being operable to suppress the interference caused by the downlink synchronization channel.

16. A wireless receiver, comprising:
at least one processor;
a non-transitory computer-readable storage medium, coupled to the at least one processor, the non-transitory computer-readable storage medium, further comprising computer-readable instructions, when executed by the at least one processor, are configured to:
compute a first signal-to-interference ratio (SIR) value when the wireless receiver is configured as a maximum ratio combining receiver and a second SIR value when the wireless receiver is configured as an equalizing receiver;
determine a geometry factor for a channel over which signals are transmitted to the wireless receiver, the geometry factor being a measure of a ratio of total transmitted power received by the wireless receiver to total interference plus noise power at the wireless receiver, and further configured to determine the geometry factor based on a ratio of the first and second SIR values; and
one or more signal processing modules operable to be reconfigured based on the geometry factor.

17. The wireless receiver of claim 16, wherein the computer-readable instructions, when executed by the at least one processor, are further configured to generate an SIR estimate, and wherein the geometry factor processing module is operable to determine the geometry factor based on the SIR estimate.

18. The wireless receiver of claim 17, wherein the computer-readable instructions, when executed by the at least one processor, are further configured to:
estimate the SIR based on channel estimates derived from a pilot signal transmitted over a pilot channel, the pilot channel having a transmit power level which is unknown to the wireless receiver,
estimate the transmit power level of the pilot channel, and
determine the geometry factor based on a ratio of the transmit power level estimate to the SIR estimate.

19. The wireless receiver of claim 18, wherein the computer-readable instructions, when executed by the at least one processor, are further configured to:
despread the pilot signal at a plurality of path delays,
filter the pilot signal after despreading, and
integrate the pilot signal after low-pass filtering to estimate the transmit power level of the pilot channel.

20. The wireless receiver of claim 19, wherein the computer-readable instructions, when executed by the at least one processor, are further configured to:
include in the estimate of the transmit power level of the pilot channel a power estimate for one or more additional path delays not used to despread the pilot channel.

21. The wireless receiver of claim 18, wherein the computer-readable instructions, when executed by the at least one processor, are further configured to:
despread the pilot signal at a plurality of path delays to generate despread pilot signal values, and
multiply each despread pilot signal value by a delay spacing distance and sum results of the multiplication to generate an instantaneous estimate of the transmit power level of the pilot channel.

22. The wireless receiver of claim 21, wherein the computer-readable instructions, when executed by the at least one processor, are further configured to:

smooth the instantaneous estimate of the transmit power level of the pilot channel over a plurality of slots.

23. The wireless receiver of claim 16, wherein the computer-readable instructions, when executed by the at least one processor, are further configured to:
compute combining weights,
compute net channel coefficients, and
determine the geometry factor based on a degree of correlation between the combing weights and the net channel coefficients.

24. The wireless receiver of claim 23, wherein the computer-readable instructions, when executed by the at least one processor, are further configured to:
set the geometry factor to a first value indicating a relatively high degree of interference responsive to the degree of correlation being above a particular threshold value and otherwise set the geometry factor to a second value indicating a relatively low degree of interference.

25. The wireless receiver of claim 16, wherein the computer-readable instructions, when executed by the at least one processor, are further configured to:
determine a number of equalizer fingers or equalizer taps used for interference cancellation as a function of the geometry factor.

26. The wireless receiver of claim 25, wherein the computer-readable instructions, when executed by the at least one processor, are further configured to:
disable equalization and enable maximum ratio combining at the wireless receiver responsive to the geometry factor being below a particular threshold.

27. The wireless receiver of claim 16, wherein the computer-readable instructions, when executed by the at least one processor, are further configured to:
determine an amount of filtering applied to one or more generated estimates as a function of the geometry factor.

28. The wireless receiver of claim 16, wherein the computer-readable instructions, when executed by the at least one processor, are further configured to:
determine a number of parameters estimated during parametric equalization as a function of the geometry factor.

29. The wireless receiver of claim 16, wherein the computer-readable instructions, when executed by the at least one processor, are further configured to:
determine, as a function of the geometry factor, an amount of soft scaling applied to symbols received by the wireless receiver which are subject to interference caused by a downlink synchronization channel.

30. The wireless receiver of claim 29, wherein the computer-readable instructions, when executed by the at least one processor, are further configured to:
determine whether to enable or disable as a function of the geometry factor, suppression of the interference caused by the downlink synchronization channel.

* * * * *